United States Patent
Hong et al.

(10) Patent No.: US 12,332,600 B2
(45) Date of Patent: Jun. 17, 2025

(54) HOLOGRAM IMAGE NORMALIZATION METHOD FOR HOLOGRAPHIC PRINTER

(71) Applicant: Korea Electronics Technology Institute, Seongnam-si (KR)

(72) Inventors: Ji Soo Hong, Seoul (KR); Sung Hee Hong, Seoul (KR); Young Min Kim, Seoul (KR); Jin Soo Jeong, Seoul (KR); Byoung Hyo Lee, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/013,305

(22) PCT Filed: Dec. 15, 2021

(86) PCT No.: PCT/KR2021/019025
§ 371 (c)(1),
(2) Date: Dec. 28, 2022

(87) PCT Pub. No.: WO2023/113062
PCT Pub. Date: Jun. 22, 2023

(65) Prior Publication Data
US 2024/0111250 A1 Apr. 4, 2024

(30) Foreign Application Priority Data
Dec. 13, 2021 (KR) ........................ 10-2021-0177361

(51) Int. Cl.
*G03H 1/04* (2006.01)
*G03H 1/02* (2006.01)
*G03H 1/22* (2006.01)

(52) U.S. Cl.
CPC ........... *G03H 1/0476* (2013.01); *G03H 1/024* (2013.01); *G03H 1/2249* (2013.01);
(Continued)

(58) Field of Classification Search
CPC .... G03H 1/0476; G03H 1/024; G03H 1/2249; G03H 2001/0224; G03H 2001/0232;
(Continued)

(56) References Cited

U.S. PATENT DOCUMENTS

2015/0261186 A1\* 9/2015 Oh ........................... G03H 1/30
359/10

FOREIGN PATENT DOCUMENTS

JP 2018-180261 A 11/2018

OTHER PUBLICATIONS

Seo, Young-Ho, et al. "Implementation of Parallel Computer Generated Hologram Using Multi-GPGPU." Journal of the Korea Institute of Information and Communication Engineering 18.5 (2014): 1177-1186, (10 pages in Korean, Abstract in English).
(Continued)

*Primary Examiner* — Arnel C Lavarias
(74) *Attorney, Agent, or Firm* — NSIP Law

(57) ABSTRACT

Provided is a hologram image normalization method for a holographic printer. In a holographic printing method according to an embodiment, generating, encoding, and normalizing for the (n+1)-th hogel are performed in parallel with loading and recording of a normalized hologram for the n-th hogel, and moving and waiting for the (n+1)-th hogel. Accordingly, a global maximum value and a global minimum value for normalization may be calculated as approximate estimation values, and a hologram generation process and a printing process may be performed in parallel, so that a total printing time may be minimized and memory usage may be optimized when holographic printing is performed.

19 Claims, 12 Drawing Sheets

(52) U.S. Cl.
CPC ............... *G03H 2001/0224* (2013.01); *G03H 2001/0232* (2013.01); *G03H 2001/2263* (2013.01)

(58) Field of Classification Search
CPC ............ G03H 2001/2263; G03H 1/00; G03H 1/0005; G03H 1/04; G03H 1/0443; G03H 2001/0478; G03H 2001/048; G03H 1/08; G03H 1/0808; G03H 2001/0816; G03H 1/0866; G03H 2001/0883; G03H 1/0891
USPC .......... 359/9, 1, 12, 22, 32, 33, 35; 430/1, 2
See application file for complete search history.

(56) References Cited

OTHER PUBLICATIONS

Korean Office Action issued on May 31, 2023, in counterpart Korean Patent Application No. 10-2021-0177361 (3 pages in English, 5 pages in Korean).

\* cited by examiner

HOLOGRAM IMAGE NORMALIZATION METHOD FOR HOLOGRAPHIC PRINTER

CROSS REFERENCE TO RELATED APPLICATIONS

This application is a U.S. National Stage Application of International Application No. PCT/KR2021/019025, filed on Dec. 15, 2021, which claims the benefit under 35 USC 119(a) and 365(b) of Korean Patent Application No. 10-2021-0177361, filed on Dec. 13, 2021, in the Korean Intellectual Property Office, the entire disclosure of which is incorporated herein by reference for all purposes.

TECHNICAL FIELD

The present disclosure relates to a holographic printing technology, and more particularly, to a hologram image normalization method for minimizing a total printing time and optimizing memory usage in performing holographic printing.

BACKGROUND ART

In order to record and reproduce a digital hologram image with a high resolution, a related-art holographic printer may divide a digital hologram image of a high resolution into images of a resolution to be expressible by one spatial light modulator (SLM) as shown in FIG. 1, and may record the divided images on a holographic film.

In this case, a unit based on which an image is divided and recorded is referred to as a hogel, and, as shown in FIG. 2, when hogels are recorded on a holographic film, a complex hologram image corresponding to each hogel is used as an object beam, and hogels are recorded through interference of the object beam with a reference beam separately given, according to a related-art analogue holography method. The hogels recorded in sequence in this method are able to express a hologram image of a high resolution when the recording is completed.

In this case, each hogel may show an image to an observer within a diffraction angle which is determined by a wavelength of a light source and a pixel size of a hogel image. Accordingly, as shown in FIG. 3, a complex hologram image to be recorded on the hogel should generate and record a complex hologram that is able to represent a portion of a target 3D model that belongs to a region covered by the diffraction angle of the hogel.

Accordingly, in order to generate the complex hologram to be recorded on the hogel, color and distance maps should be obtained, first, by rendering the portion of the target 3D model that belongs to the region of the diffraction angle of the hogel as a rendering frustum, and then, the complex hologram should be generated by using the color and distance maps.

One of the related-art methods for generating a computer-generated hologram (CGH) is the method of expressing a target object by using a point cloud data set and then applying the Rayleigh-Sommerfeld diffraction integral equation as shown in FIG. 4.

In this case, if a complex amplitude of each point of a point cloud data set is indicated by $A_p = a_p e^{j\Phi_p}$ and 3-dimensional (3D) coordinates of each point are indicated by $(x_p, y_p, z_p)$, a complex hologram generated by the point cloud data set may be expressed by $u(x,y) = \Sigma_p A_p h_p(x,y)$, and in this case, an impulse response $h_p(x, y)$ as to each point may be expressed by $$h_p(x, y) = \begin{cases} \dfrac{z}{j\lambda} \dfrac{\exp\left[-(z_p/|z_p|)jk\sqrt{(x-x_p)^2+(y-y_p)^2+z_p^2}\right]}{\left[(x-x_p)^2+(y-y_p)^2+z_p^2\right]}, & \dfrac{|x-x_p|}{\lambda_r} < \dfrac{1}{2p_x}, \dfrac{|y-y_p|}{\lambda_r} < \dfrac{1}{2p_y} \\ 0, & \text{otherwise} \end{cases}$$

In this case, r equals $\sqrt{(x-x_p)^2+(y-y_p)^2+z_p^2}$, and $p_x$, $p_y$ indicate pixel sizes in an x-direction, a y-direction on a hologram plane, respectively.

Beside these, there are various methods for generating a complex hologram for a target 3D object, such as a method of representing a target object as a depth slice image and calculating, etc. However, an appropriate conversion procedure may be required to express a complex hologram which results from the above-described calculation on an SLM.

Typically, the SLM is not able to represent an amplitude and a phase necessary for representing a complex hologram, simultaneously, and an SLM capable of representing only an amplitude is mostly used. Accordingly, as shown in FIG. 5, a complex hologram $u(x, y)$ calculated is converted to have only a real number, first, through various encoding methods such as single-sideband encoding. If an encoded hologram is $u_R(x, y)$, a maximum value M and a minimum value m are found to allow a maximum dynamic range of the SLM to be used, and then, normalization is performed to map the maximum value and the minimum value onto 1 and 0, respectively, as shown in the following equation, and a normalized hologram $u_N(x, y)$ is obtained.

$$u_N(x, y) = \dfrac{u_R(x, y) - m}{M - m}$$

Thereafter, the normalized hologram image obtained in this way is appropriately scaled to suit a bit depth of the SLM and is loaded on the SLM, and then, an original complex hologram is restored therefrom by using an optical method using a 4f-system, and is reduced. When the original complex hologram is transmitted to a holographic material (film), a complex hologram may be recorded on the basis of a hogel as intended.

To summarize, the procedure necessary for generating a hologram image to be loaded on an SLM may include rendering color and depth maps for each hogel, calculating a complex hologram from the color and depth maps, encoding the complex hologram, and normalizing the encoded hologram, as shown in upper view of FIG. 6

In order to record the normalized hologram, calculated in the above-described method, on a holographic material, a procedure of controlling a holographic printer as shown in lower view of FIG. 6 may be required. This procedure may include loading the normalized hologram image for the hogel on the SML, recording by exposing the hologram image to a target hogel position on the holographic material, moving a stage to a next hogel position in order to record the next hogel, and then, waiting until a vibration caused by the movement of the stage is entirely removed.

In this case, the step of calculating the complex hologram in the hologram image generation procedure requires much time, and the step of waiting until the vibration is removed in the printer controlling procedure requires much time, and as a result, when the procedure of generating the hologram image for all hogels and the procedure of recording the hogels on the holographic film are separately performed, the total time required to perform the procedures increases.

Accordingly, proceeding with hologram image generation and holographic printer control in parallel through appropriate time scheduling is the method of efficiently using time. However, related-art methods have no choice but to generate all hologram images and then to record hogels on a holographic film for the reasons presented below.

If the total number of hogels to be recorded on a holographic material is $N_1 \times N_2$, a global maximum value and a global minimum value of all hogels should be used as a maximum value and a minimum value used for normalizing after complex holograms to be recorded on the respective hogels are encoded. That is, as shown in FIG. 7, when a maximum value and a minimum value are calculated for each hogel after the complex hologram for each hogel is generated and then is encoded, if it is revealed that a maximum value $M(i, j)$ of a $(i, j)$-th hogel is a global maximum value and a minimum value $m(p, q)$ of a $(p, q)$-th hogel is a global minimum value, an encoded hologram $u_R^{(s,t)}(x, y)$ of a certain $(s, t)$-th hogel should be normalized by using the maximum value $M(i, j)$ and the minimum value $m(p, q)$ as a global maximum value $M_G$ and a global minimum value $m_G$ by the following equation:

$$u_N^{(s,t)}(x, y) = \frac{u_R^{(s,t)}(x, y) - m_G}{M_G - m_G}$$

Accordingly, the normalization step for the respective hogels is not performed until all encoded holograms are obtained for the respective hogels and a global maximum value and a global minimum value are found.

Accordingly, in the related-art hologram printing procedure, the step of recording the respective hogels through the holographic printer may not be performed until encoded holograms for all hogels are obtained, a global maximum value and a global minimum value are found, and then, all of the encoded holograms are normalized.

In this case, the process of obtaining all encoded holograms may require much time, and all encoded holograms resulting therefrom should be stored in a memory. Therefore, there is a problem that memory usage greatly increases.

DISCLOSURE

Technical Problem

The present disclosure has been developed in order to address the above-discussed deficiencies of the prior art, and an object of the present disclosure is to provide a method of enabling hologram generation and printing to be performed in parallel by calculating a global maximum value and a global minimum value for normalization as approximate estimation values, as a solution to minimize a total printing time and to optimize memory usage in performing holographic printing.

Technical Solution

According to an embodiment of the present disclosure to achieve the above-described object, there is provided a holographic printing method, including: generating a hologram for an n-th hogel constituting a hologram; encoding the generated hologram; normalizing the encoded hologram; loading the normalized hologram on an SLM; restoring an original hologram from the hologram loaded on the SLM, and recording the original hologram on a holographic material; moving a position of a stage where the holographic material is placed to a position on the holographic material where an (n+1)-th hogel is recorded; and waiting until the moved stage is stabilized, wherein generating, encoding, and normalizing for the (n+1)-th hogel are performed in parallel with loading and recording for the n-th hogel and moving and waiting for the (n+1)-th hogel.

When loading for the n-th hogel starts, generating for the (n+1)-th hogel may start.

Normalizing may include normalizing by using a global maximum value and a global minimum value of an encoded hologram that are estimated as approximate values.

The global maximum value and the global minimum value of the encoded hologram that are estimated as approximate values may be calculated by using some of the hogels constituting the hologram.

Some of the hogels may be k hogel that are selected in order from a hogel having a largest total sum of pixel values of a color image used for generating the hologram. k may be configurable.

The holographic printing method may further include storing encoded holograms for the k hogels which are used for calculating the global maximum value and the global minimum value, and, with respect to the k hogels, generating and encoding may not be performed and the stored encoded holograms may be used.

When normalizing for the (n+1)-th hogel is completed but waiting is not completed, the method may wait for starting of generating for an (n+2)-th hogel. When waiting is completed but normalizing for the (n+1)-th hogel is not completed, the method may wait for starting of loading for the (n+1)-th hogel.

According to another embodiment of the present disclosure, there is provided a holographic printing system, including: a hologram generation system configured to generate a hologram for an n-th hogel constituting a hologram, to encode the generated hologram, and to normalize the encoded hologram; and a holographic printer configured to load the normalized hologram on an SLM, to restore an original hologram from the hologram loaded on the SLM, to record the original hologram on a holographic material, to move a position of a stage where the holographic material is placed to a position on the holographic material where an (n+1)-th hogel is recorded, and to wait until the moved stage is stabilized, wherein generating, encoding, and normalizing for the (n+1)-th hogel by the hologram generation system are performed in parallel with loading and recording for the n-th hogel and moving and waiting for the (n+1)-th hogel by the holographic printer.

According to another embodiment of the disclosure, there is provided a holographic printing method, including: generating a hologram for an n-th hogel constituting a hologram; encoding the generated hologram; and normalizing the encoded hologram, wherein generating, encoding, and normalizing are performed in parallel with operations of:

loading a normalized hologram for an (n−1)-th hogel on an SLM; restoring an original hologram from the hologram loaded on the SLM, and recording the original hologram on a holographic material; moving a position of a stage where the holographic material is placed to a position on the holographic material where an (n+1)-th hogel is recorded; and waiting until the moved stage is stabilized.

According to another embodiment of the disclosure, there is provided a computer-readable recording medium having a program recorded thereon to perform a holographic printing method, the method including: generating a hologram for an n-th hogel constituting a hologram; encoding the generated hologram; normalizing the encoded hologram; loading the normalized hologram on an SLM; restoring an original hologram from the hologram loaded on the SLM, and recording the original hologram on a holographic material; moving a position of a stage where the holographic material is placed to a position on the holographic material where an (n+1)-th hogel is recorded; and waiting until the moved stage is stabilized, wherein generating, encoding, and normalizing for the (n+1)-th hogel are performed in parallel with loading and recording for the n-th hogel and moving and waiting for the (n+1)-th hogel.

Advantageous Effects

According to embodiments of the present disclosure as described above, a global maximum value and a global minimum value for normalization may be calculated as approximate estimation values, and a hologram generation process and a printing process may be performed in parallel, so that a total printing time may be minimized and memory usage may be optimized when holographic printing is performed.

BEST MODE

Hereinafter, the present disclosure will be described in more detail with reference to the drawings.

An embodiment of the present disclosure provides a method of calculating and using estimation values of a global maximum value and a global minimum value, instead of calculating an exact global maximum value and global minimum value by examining all encoded hologram images, in generating a normalized hologram image for each hogel for holographic printing.

That is, in an embodiment, normalization is performed by using a global maximum value and a global minimum value of an encoded hologram that are estimated as approximate values, not by using real values.

To achieve this, on the assumption that a maximum value and a minimum value of a hogel image are proportional to a total sum of pixel values (intensity) of each color channel of a color image in color image and depth maps used for generating a complex hologram, a color image for each hogel is rendered, and then, a total sum of pixel values of the color image of each hogel is obtained for each color channel, and then, hogels are selected up to the k-th hogel in order from one having the largest total sum.

In this case, k is a margin in case that a hogel having the largest total sum of color image pixel values does not match a global maximum value and a global minimum value, and is a value that is heuristically determined.

In addition, complex holograms for the k hogels selected in this way are calculated, and then, encoded hologram images are generated, and a maximum value and a minimum value are obtained thereamong and are used as estimation values of a global maximum value and a global minimum value.

Figure 1:
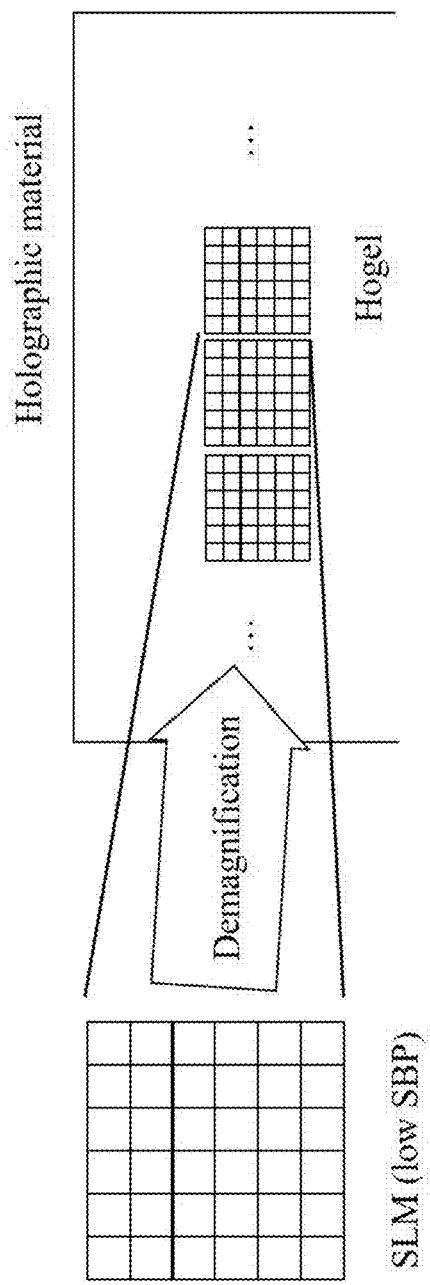
FIG. 1 is a conceptual diagram of hologram printing.
Figure 2:
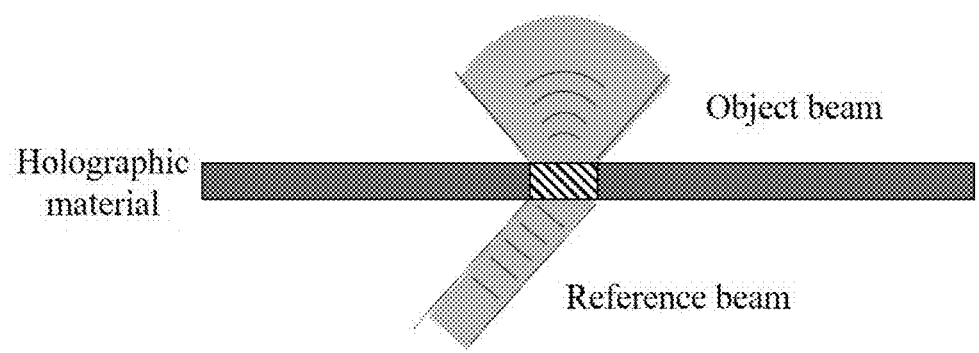
FIG. 2 is a conceptual diagram of a hogel.
Figure 3:
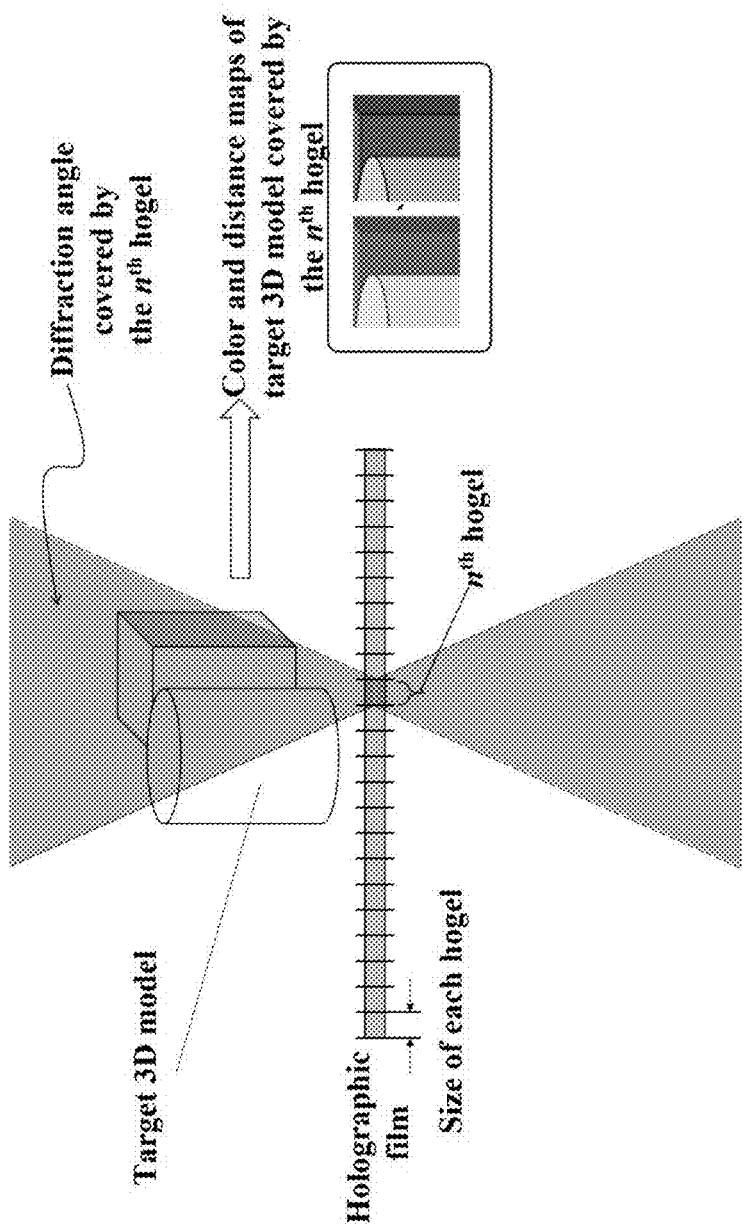
FIG. 3 is a view illustrating a method of rendering color image and depth maps for each hogel for hologram printing.
Figure 4:
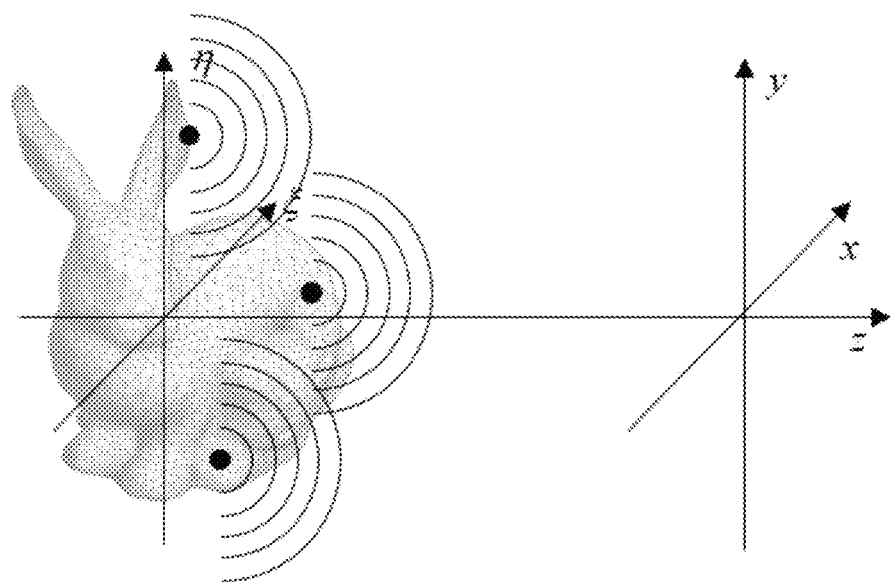
FIG. 4 is view illustrating generating a hologram by using a point cloud data set.
Figure 5:
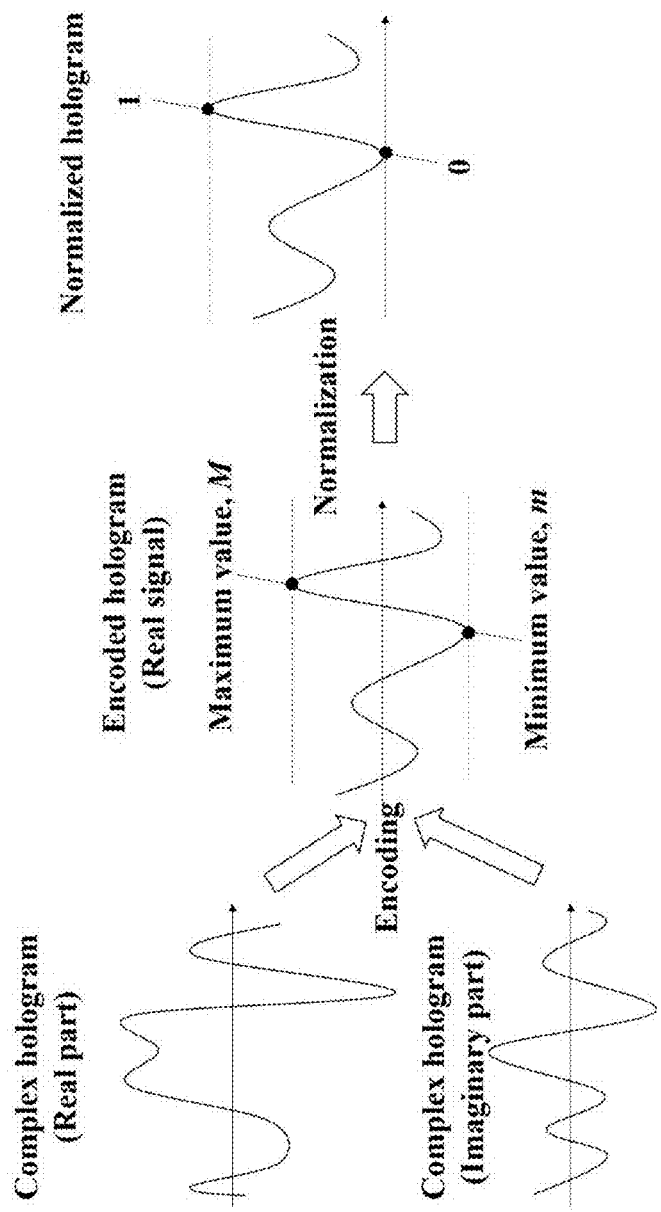
FIG. 5 is a view illustrating a procedure of obtaining a normalized hologram for each hogel.
Figure 6:
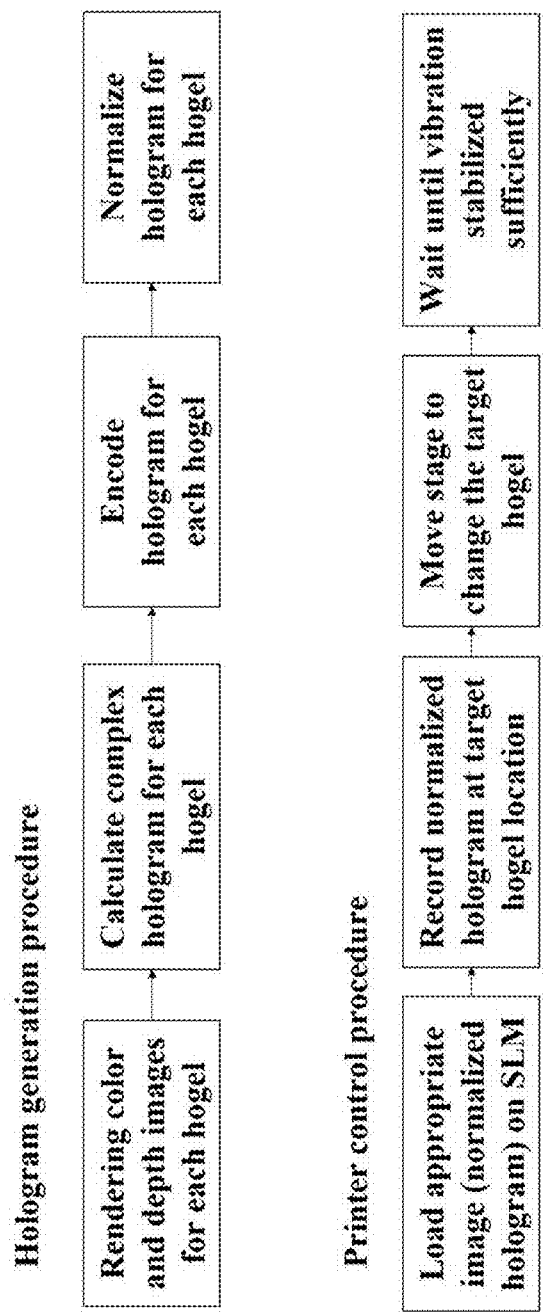
FIG. 6 is a view illustrating (a) a hologram generation procedure and (b) a printer control procedure for hologram printing.
Figure 7:
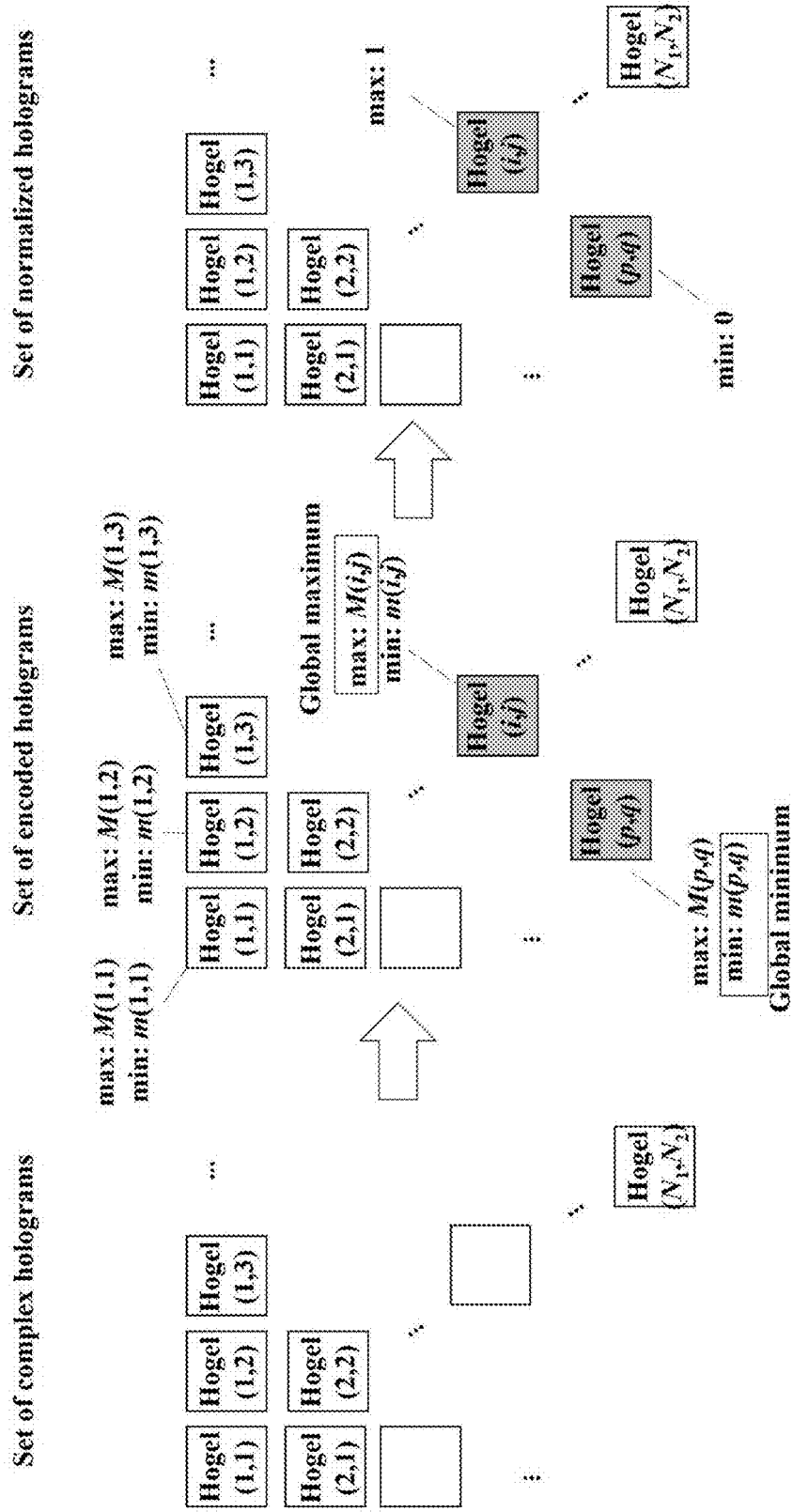
FIG. 7 is a view illustrating a process of obtaining a global maximum value and a global minimum value.
Figure 8:
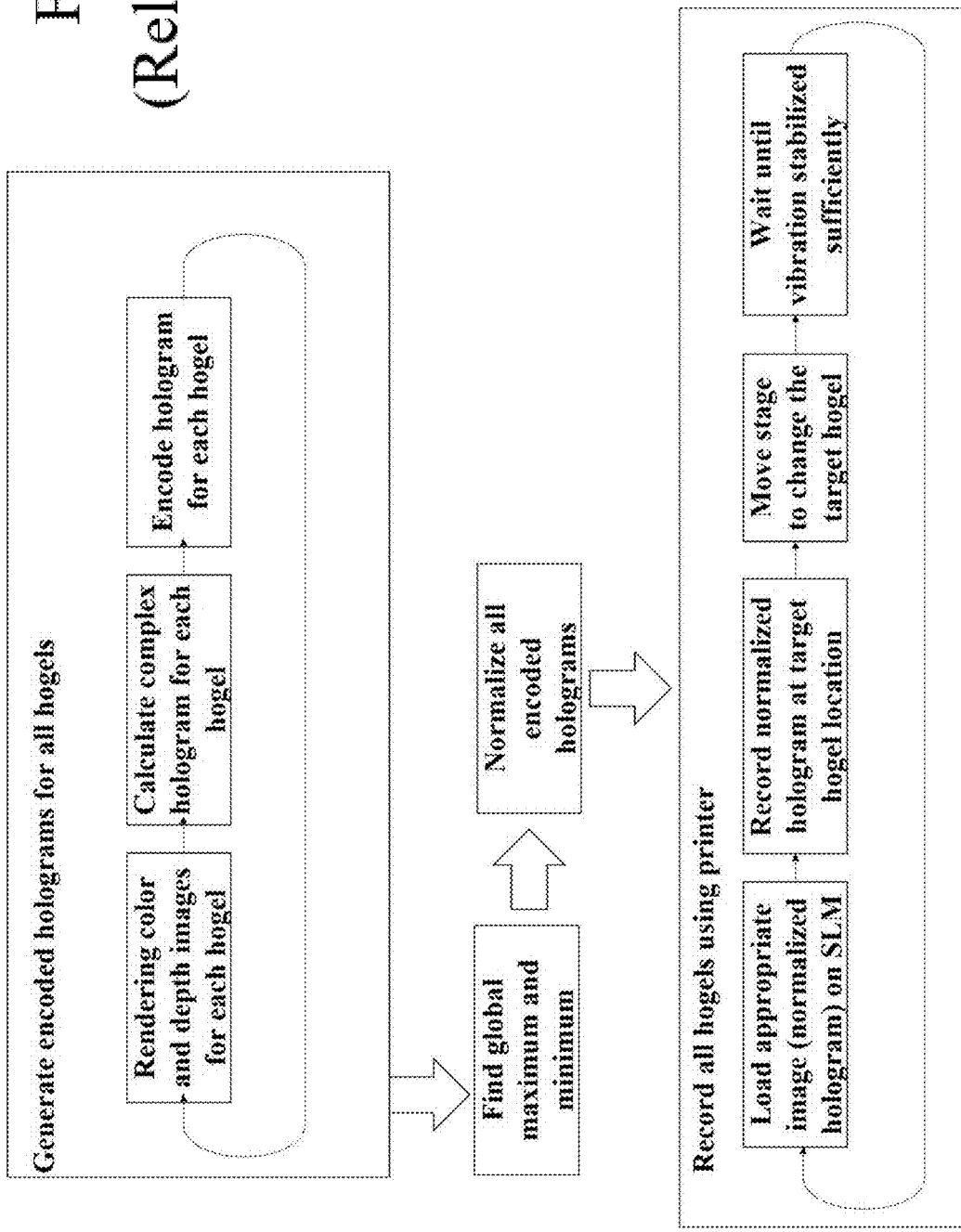
FIG. 8 is a view illustrating an overall process of hologram generation and printing according to a related-art method.
Figure 9:
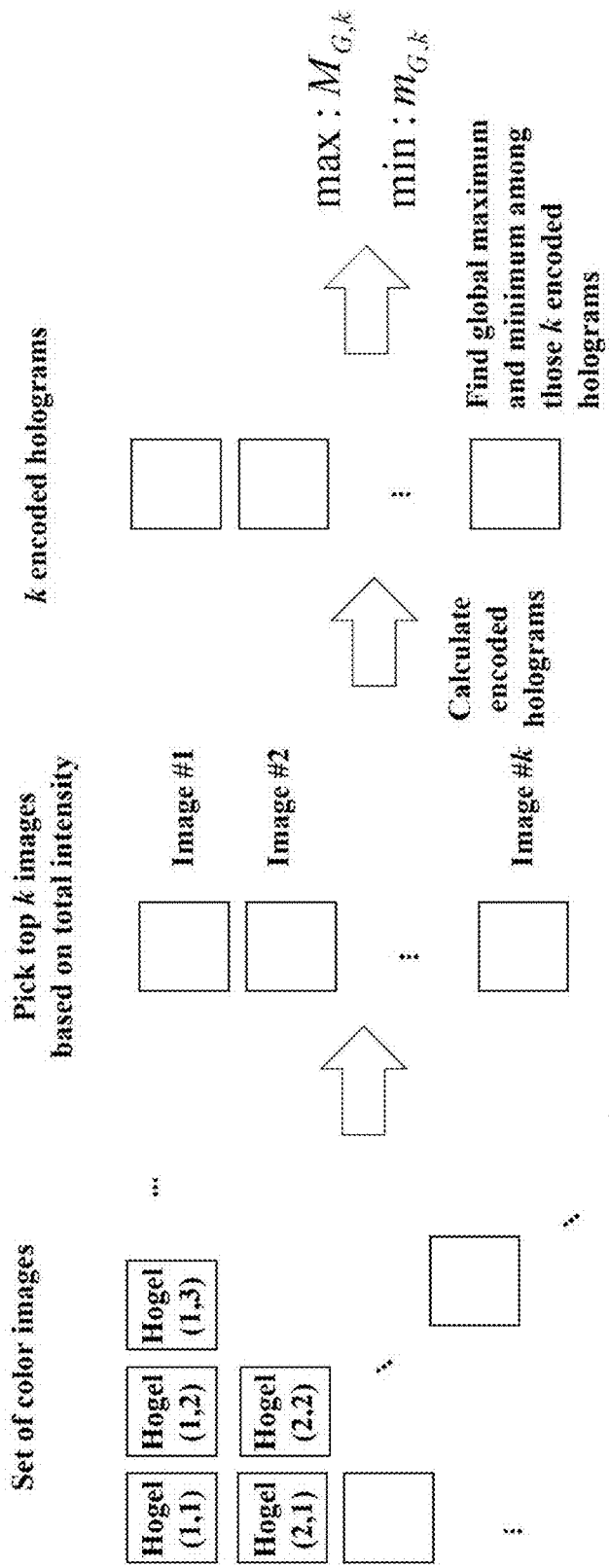
FIG. 9 is a view illustrating a process of estimating a global maximum value and a global minimum value.

In this case, as k increases, the estimation values are more closely approximate to the global maximum value and the global minimum value, but the total amount of calculation increases. Therefore, appropriate values should be set as the global maximum value and the global minimum value. FIG. 9 illustrates a process of obtaining estimation values of the global maximum value and the global minimum value as described above.

Figure 10:
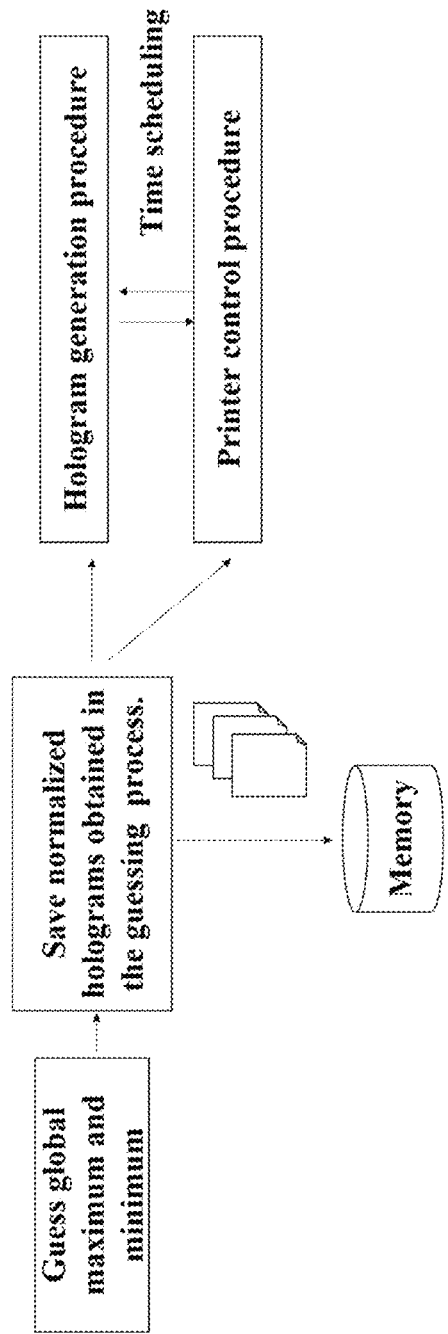
FIG. 10 is a view illustrating an overall process of hologram generation and printing according to an embodiment of the disclosure.

A process of generating and printing a hologram after the global maximum value and the global minimum value are calculated is illustrated in FIG. 10.

First, k hogels are selected and a global maximum value and a global minimum value are estimated. In this case, encoded holograms for the k hogels which are generated in the process of estimating are stored in a memory to save a time required to calculate afterward. Thereafter, processes of generating, encoding complex holograms for the k hogels are not necessary.

To generate normalized hologram images for next hogels, normalization may be performed by using previously obtained estimation values of the maximum value and the minimum value, and the hologram generation procedure and the holographic printer control procedure are performed in parallel through time scheduling.

Figure 11:
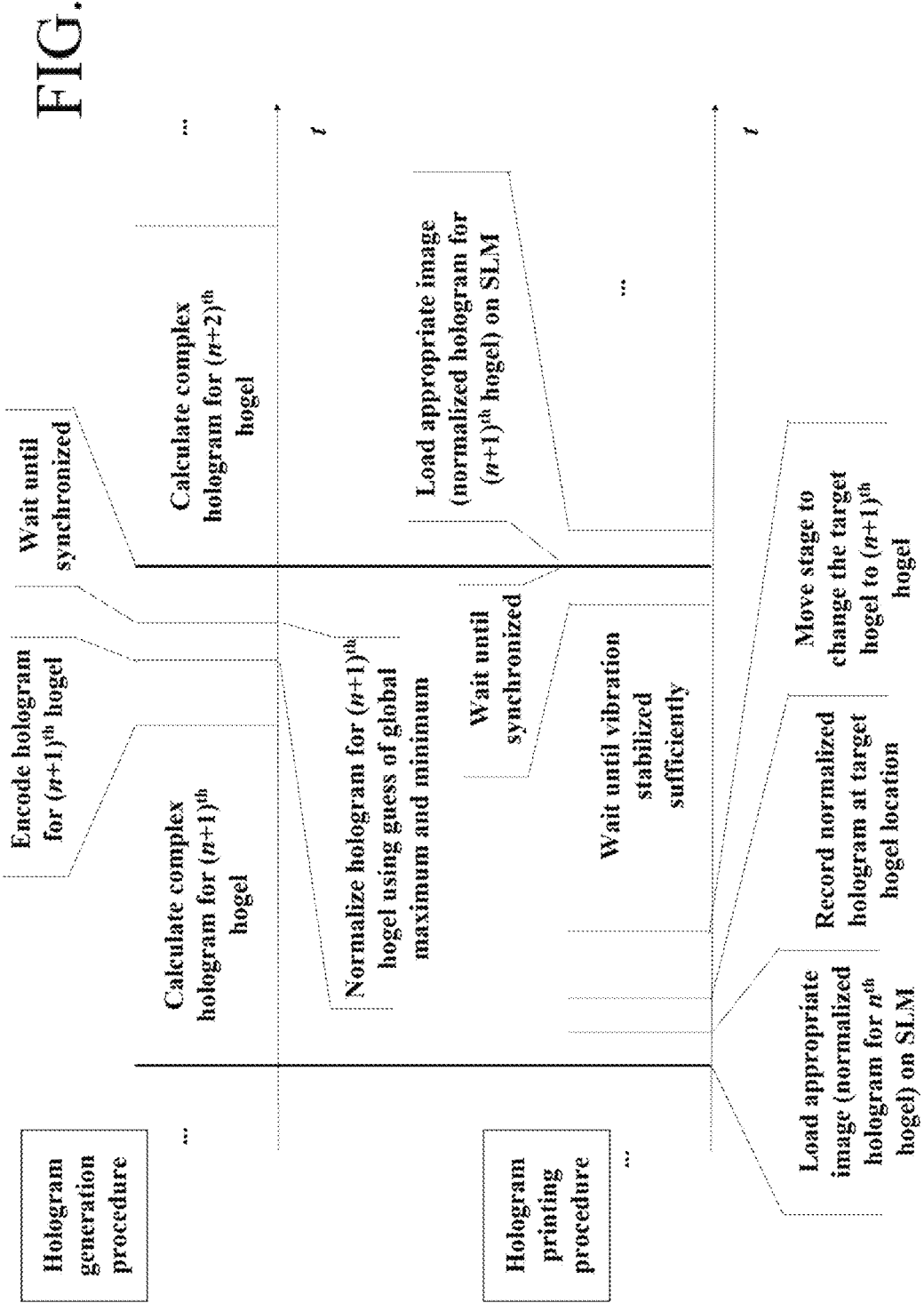
FIG. 11 is a view illustrating a time scheduling method of hologram generation and printing according to an embodiment of the disclosure.

FIG. 11 illustrates a time scheduling method between a hologram generation procedure and a holographic printer control procedure according to an embodiment of the disclosure.

As shown on the lower portion, the holographic printer loads a normalized hologram image for the n-th hogel onto an SLM, and restores an original hologram from the hologram loaded on the SLM by using an optical system, and records by exposing the original hologram to a target hogel position of a holographic material.

Next, the holographic printer moves a position of a stage where the holographic material is placed to a 'position on the holographic material where the n+1)-th hogel will be recorded, and changes the target hogel position to the position of the (n+1)-th hogel, and waits for a pre-defined time until the moved stage is stabilized.

When the stage is stabilized but generation of a normalized hologram for the (n+1)-th hogel is not completed in the holographic printer, the holographic printer waits for synchronization.

At the same time as loading the normalized hologram image for the n-th hogel on the SLM by the holographic printer, a hologram generation system starts generating a complex hologram for the (n+1)-th hogel as shown on the upper portion of FIG. 11. Thereafter, the hologram generation system encodes the generated complex hologram and normalizes the encoded hologram.

In this process, when there is an encoded hologram that matches a target hogel to be generated at the present time, among the k encoded holograms which are previously used to estimate a global maximum value and a global minimum value, the hologram generation system invokes a corresponding encoded hologram from a memory instead of generating and encoding the hologram.

When generation of the complex hologram for the (n+1)-th hogel is completed, but recording of the n-th hogel and stage movement and waiting for recording the (n+1)-th hogel are not finished in the holographic printer, the hologram generation system waits for synchronization.

The above-described process is repeated for all hogels, such that hologram generation and printing are performed in parallel. Through the above-described method, the total time required to generate and record may be reduced, and also, a capacity to store the encoded holograms may be greatly reduced, and accordingly, memory usage may be greatly reduced.

Figure 12:
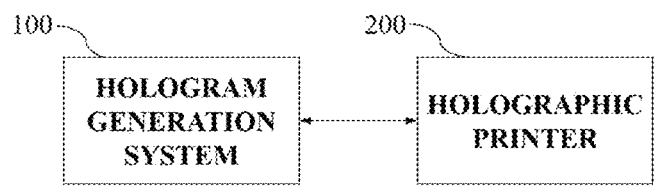
FIG. 12 is a view illustrating a system for hologram generation and printing according to another embodiment of the disclosure.

FIG. 12 is a view illustrating a system for generating and printing a hologram according to another embodiment of the present disclosure. The system according to an embodiment of the present disclosure may include a hologram generation system 100 and a holographic printer 200 as shown in FIG. 12.

The hologram generation system 100 is a computing system that has software installed therein to perform the procedure illustrated on the upper portion of FIG. 11, and the holographic printer 200 is controlled by software for performing the procedure illustrated on the lower portion of FIG. 11.

Up to now, a method for minimizing a hologram printing time and optimizing memory usage by obtaining approximate estimation values of a global maximum value and a global minimum value, rather than obtaining an exact global maximum value and minimum value for normalization, in generating a normalized hologram for each hogel for hologram printing, and by enabling a hologram generation procedure and a printing procedure to be performed in parallel by using the estimation values.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

The invention claimed is:

1. A holographic printing method comprising:
generating a hologram for an n-th hogel constituting a hologram, the n-th hogel being a hogel located at an n-th position among a plurality of hogels;
encoding the generated hologram;
normalizing the encoded hologram;
loading the normalized hologram on a spatial light modulator (SLM);
restoring an original hologram from the hologram loaded on the SLM, and recording the original hologram on a holographic material;
moving a position of a stage where the holographic material is placed to a position on the holographic material where an (n+1)-th hogel is recorded; and
waiting until the moved stage is stabilized,
wherein generating, encoding, and normalizing for the (n+1)-th hogel are performed in parallel with loading and recording for the n-th hogel and moving and waiting for the (n+1)-th hogel.

2. The holographic printing method of claim 1, wherein, when loading for the n-th hogel starts, generating for the (n+1)-th hogel starts.

3. The holographic printing method of claim 1, wherein normalizing comprises normalizing by using a global maximum value and a global minimum value of an encoded hologram that are estimated as approximate values.

4. The holographic printing method of claim 3, wherein the global maximum value and the global minimum value of the encoded hologram that are estimated as approximate values are calculated by using some of the hogels constituting the hologram.

5. The holographic printing method of claim 4, wherein some of the hogels are k hogels that are selected in order from a hogel having a largest total sum of pixel values of a color image used for generating the hologram.

6. The holographic printing method of claim 5, wherein the k is a number of the selected hogels and the k is configurable.

7. The holographic printing method of claim 4, further comprising storing encoded holograms for the k hogels which are used for calculating the global maximum value and the global minimum value,
wherein, with respect to the k hogels, generating and encoding are not performed and the stored encoded holograms are used.

8. The holographic printing method of claim 7, wherein, when normalizing for the (n+1)-th hogel is completed but waiting is not completed, the method waits for starting of generating for an (n+2)-th hogel.

9. The holographic printing method of claim 1, wherein, when waiting is completed but normalizing for the (n+1)-th hogel is not completed, the method waits for starting of loading for the (n+1)-th hogel.

10. A holographic printing system comprising:
a hologram generation system configured to generate a hologram for an n-th hogel constituting a hologram, to encode the generated hologram, and to normalize the encoded hologram, the n-th hogel being a hogel located at an n-th position among a plurality of hogels; and
a holographic printer configured to load the normalized hologram on a spatial light modulator (SLM), to restore an original hologram from the hologram loaded on the SLM, to record the original hologram on a holographic material, to move a position of a stage where the holographic material is placed to a position on the holographic material where an (n+1)-th hogel is recorded, and to wait until the moved stage is stabilized,
wherein generating, encoding, and normalizing for the (n+1)-th hogel by the hologram generation system are performed in parallel with loading and recording for the n-th hogel and moving and waiting for the (n+1)-th hogel by the holographic printer.

11. A holographic printing method comprising:
generating a hologram for an n-th hogel constituting a hologram, the n-th hogel being a hogel located at an n-th position among a plurality of hogels;
encoding the generated hologram; and
normalizing the encoded hologram,
wherein the generating, the encoding, and the normalizing are performed in parallel with operations of: loading a normalized hologram for an (n−1)-th hogel on a spatial light modulator (SLM); restoring an original hologram from the hologram loaded on the SLM, and recording the original hologram on a holographic material; moving a position of a stage where the holographic material is placed to a position on the holographic material where an (n+1)-th hogel is recorded; and waiting until the moved stage is stabilized.

12. The system of claim 10, wherein, when loading for the n-th hogel starts, generating for the (n+1)-th hogel starts.

13. The system of claim 10, wherein, for normalizing the encoded hologram, the hologram generation system is configured to normalize by using a global maximum value and a global minimum value of an encoded hologram that are estimated as approximate values.

14. The system of claim 13, wherein the global maximum value and the global minimum value of the encoded hologram that are estimated as approximate values are calculated by using some of the hogels constituting the hologram.

15. The system of claim 14, wherein some of the hogels are k hogels that are selected in order from a hogel having a largest total sum of pixel values of a color image used for generating the hologram.

16. The system of claim 15, wherein the k is a number of the selected hogels and the k is configurable.

17. The system of claim 14, further comprising storing encoded holograms for the k hogels which are used for calculating the global maximum value and the global minimum value,
wherein, with respect to the k hogels, generating and encoding are not performed and the stored encoded holograms are used.

18. The system of claim 17, wherein, when normalizing for the (n+1)-th hogel is completed but waiting is not completed, the holographic printing system waits for starting of generating for an (n+2)-th hogel.

19. The system of claim 10, wherein, when waiting is completed but normalizing for the (n+1)-th hogel is not completed, the holographic printing system waits for starting of loading for the (n+1)-th hogel.

* * * * *